Patented Nov. 15, 1932

1,887,967

UNITED STATES PATENT OFFICE

ROBERT R. TANNER, OF DETROIT, AND VAN M. DARSEY, OF MORENCI, MICHIGAN, ASSIGNORS TO PARKER RUST PROOF COMPANY, OF DETROIT, MICHIGAN, A CORPORATION OF MICHIGAN

COMPOSITION FOR COATING METALS AND METHOD OF MAKING THE SAME

No Drawing.   Application filed January 10, 1929.  Serial No. 331,705.

This invention relates to a composition for coating metals and the method of making the same. More particularly, the invention relates to a composition for coating metals, especially iron, with phosphate coatings suitable for bonding to the metal paint, enamel, nickel plating or other finishing coats.

The invention has for its object to produce a material suitable for replenishing a bath and maintaining it in proper condition to form a bonding coat on iron, steel, zinc and their alloys.

Other features and objects of the invention will appear as the description proceeds. There will be described first one specific method of carrying out the invention and then the principles of the invention and the range of equivalents and approximations will be indicated.

Coating articles of iron and steel with phosphate coatings for rust-proofing purposes and for purposes of forming a base for other coatings is well known. A patent to Green et al. No. 1,651,694, December 6, 1927, may be referred to as specifying a composition and method of making the same which has been widely successful and is now generally employed. The use of the composition described in said patent results in a coating which forms a very good base for paint or enamel, especially if it is brushed or similarly treated. It does not form a good base for plating. Furthermore, the composition disclosed in that patent, and similar compositions consisting essentially of weak solutions of acid phosphates or phosphoric acid, do not readily attack metals and form a coating thereon unless the metals are thoroughly cleaned. Furthermore, a hard, smooth surface, such as polished steel, is acted upon very slowly, if at all, by such a composition unless the surface is prepared by pickling or sand blasting. If the surface is prepared by pickling, it requires a subsequent treatment before the composition readily acts thereon.

The present invention comprises forming a composition suitable for maintaining a bath that will readily attack articles of iron or steel, and those with hard, polished surfaces or with rusted surfaces, without preliminary treatment, and will very quickly form thereon a coating which constitutes a very good bond for enamel and paint and which also forms a satisfactory foundation for plating.

Such a composition can be formed by adding to the dihydrogen phosphate powder, prepared in accordance with said patent or other equivalent methods, copper oxide in the proportions of about one part of copper oxide to forty parts of the powder. Preferably this mixture is allowed to stand for several days, whereupon it will be found that the copper oxide has reacted with the phosphate powder to produce phosphate of copper. When this composition is dissolved in a bath for replenishing the same in the regular manner taught in said patent, articles of iron or steel dipped therein will be coated very quickly with an insoluble phosphate coating. The reaction begins promptly even upon hard and polished surfaces and even where the surfaces are rusted. However, grease must be removed from the surfaces in order to obtain satisfactory results. The reaction takes place very quickly, and is completed within from five to ten minutes.

The deposition of copper is more rapid in proportion to the amount in the bath than is inclusion of phosphates in the coating, and therefore as the action proceeds the proportion of copper is reduced, and a proportion such as specified for the powder is found desirable in order to insure a sufficient supply of copper in the bath.

The above described composition is the preferred composition according to our present knowledge, and the described method of forming the same is the most economical and efficient which we have thus far devised. However, there are various modifications which may be made without losing the entire benefits of the invention, and the principle of operation and the apparent scope of useful modifications will be now indicated.

A solution containing a salt of a metal less basic than iron reacts with the surface of the iron to dissolve some of the iron and displace from the salt said less basic metal. The less basic metal is separated from its salt at the surface of the iron and therefore is deposited upon the iron; but ordinarily such deposited metal is in loose flakes upon the surface of the iron and therefore does not form an adherent coating.

The action of a bath containing high acid phosphate of iron or metals more basic than iron, such as manganese or zinc, apparently comprises dissolving a portion of the surface iron and reaction therewith which results in forming a less acid or normal phosphate of iron and of the metal more basic than iron, which less acid, and therefore less soluble, phosphate is formed upon the surface of the iron and at the same time that the iron of the surface is being dissolved, and therefore forms a substantially integral and closely adherent coating on the surface of the iron. Obviously, as soon as any iron is dissolved in the bath, by the phosphoric acid therein, there is present phosphate of iron as well as of manganese and of copper, even if no phosphate of iron is previously in the bath.

When the surface of the iron is covered by specks of metal less basic than iron, such as copper, in the presence of an electrolyte, there is set up a miniature battery at each speck, which expedites the reaction of the iron with the bath to form said adherent phosphate coating. This results in the composition above described acting very promptly upon the surface of the iron to deposit specks of copper thereon and to imbed and incorporate such copper in an insoluble coating of phosphates of iron and manganese.

The resultant coating which is thus formed in a comparatively short time constitutes a very satisfactory base for enamel or paint. It can be used also as a base for plating with nickel, chromium or the like. The enamel or paint can be placed upon the coating without any subsequent treatment whatever, although a smoothing treatment may be applied if desired. Also plating has been successfully applied without subsequent treatment of the phosphate and copper coating, but the plating operation is facilitated by a buffing of the phosphate and copper coating, which exposes the copper particles and smooths the coating, resulting in a prompter deposition of the plating and a smoother finish on the plated article.

It has been found that a proportion of copper in the bath less than that resulting from the above described mixture facilitates the coating operation and is beneficial to a less degree. An excess of copper in the solution results in retarding the action of the phosphates. Presumably this is because the rapid deposition of the copper interferes with the access of the solution to the iron, but whatever the theoretical explanation of the results may be, the retarding action of a greater proportion of copper in the bath is a demonstrated result.

For commercial reasons it is preferable to produce a material in dry or powdered form which contains the proper constituents for forming the bath. Dihydrogen phosphate of copper might be produced and mixed with such a material, but it is difficult to form a dry granular or powdered dihydrogen phosphate of copper, this phosphate of copper having a tendency to remain in a somewhat plastic or jelly-like condition. For this reason, it has been found more feasible to mix with the phosphate powder a composition of copper which will react with the phosphate and produce the phosphate of copper within the powder itself.

It will be readily understood that this reaction will take place with substantially any composition of copper which is soluble in a phosphate solution.

When desired, a zinc surface may be coated in accordance with the same principles discussed above in connection with iron.

While some of the possible changes in the preferred embodiment of the invention have been referred to in the above description, it will be readily understood that other variations may be made within the scope of the appended claims.

What I claim is:

1. A granular or powdery material for replenishing a metal-coating bath, comprising soluble phosphates of copper and of metal as basic as iron, the phosphates of metal as basic as iron constituting the major portion of the material.

2. A granular or powdery material for replenishing a metal-coating bath, comprising soluble phosphates of copper and of metal as basic as iron, the copper in said phosphates being not more than one tenth as much as the metal as basic as iron in said phosphates.

3. A granular or powdery material for replenishing a metal-coating bath, comprising soluble phosphates of manganese and copper, the phosphates of manganese constituting the major portion of the material.

4. The method of preparing a material suitable for replenishing a metal-coating bath, which consists in mixing with powdered or granular high-acid phosphates of manganese, a dry compound of copper soluble in phosphoric acid, the copper in said compound being only a minor fraction of the amount of manganese in said phosphate.

5. The method of preparing a material suitable for replenishing a metal-coating bath, which consists in mixing with powdered or granular high-acid phosphates of manganese, a dry compound of copper soluble in phosphoric acid, the copper in said compound being only a minor fraction of the amount of manganese in said phosphate and allowing the mixture to react and form phosphate of copper.

6. The method of preparing a material